United States Patent [19]
Dong et al.

[11] Patent Number: 5,792,987
[45] Date of Patent: Aug. 11, 1998

[54] SEALING DEVICE

[75] Inventors: Wesley B. Dong, Belmont; Helen D. Shaughnessy, Palo Alto; Jeffrey T. Haller, San Francisco; Daniel T. Emerson, Palo Alto, all of Calif.; Jae Yoon Jung, Phoenix, Ariz.; Larry M. Edwards, Fremont, Calif.

[73] Assignee: Raychem Corporation, Menlo Park, Calif.

[21] Appl. No.: 520,324

[22] Filed: Aug. 28, 1995

[51] Int. Cl.⁶ .................................................. H02G 15/064
[52] U.S. Cl. ........................................ 174/74 A; 174/77 R
[58] Field of Search .................................... 174/76, 77 R, 174/82, 74 R, 74 A

[56] References Cited

U.S. PATENT DOCUMENTS

| | | | |
|---|---|---|---|
| 3,852,512 | 12/1974 | Herrmann, Jr. | 174/19 |
| 3,858,144 | 12/1974 | Bedard et al. | 338/22 R |
| 3,861,029 | 1/1975 | Smith-Johannsen et al. | 29/611 |
| 4,017,715 | 4/1977 | Whitney et al. | 219/553 |
| 4,186,986 | 2/1980 | Shoemaker | 339/114 |
| 4,242,573 | 12/1980 | Batliwalla | 219/528 |
| 4,332,975 | 6/1982 | Dienes | 174/76 |
| 4,334,148 | 6/1982 | Kampe | 219/553 |
| 4,334,351 | 6/1982 | Sopory | 29/611 |
| 4,426,339 | 1/1984 | Kamath et al. | 264/22 |
| 4,459,473 | 7/1984 | Kamath | 219/549 |
| 4,574,188 | 3/1986 | Midgley et al. | 219/549 |
| 4,610,738 | 9/1986 | Jervis | 156/49 |
| 4,647,717 | 3/1987 | Uken | 174/84 C |
| 4,721,832 | 1/1988 | Toy | 174/87 |
| 4,751,350 | 6/1988 | Eaton | 174/74 A |
| 4,847,447 | 7/1989 | Eiswirth et al. | 174/74 A |
| 4,859,809 | 8/1989 | Jervis | 174/92 |
| 4,877,943 | 10/1989 | Oiwa | 174/74 A |
| 4,924,034 | 5/1990 | Truesdale et al. | 174/74 A |
| 5,052,699 | 10/1991 | Tucker | 277/178 |
| 5,098,752 | 3/1992 | Chang et al. | 174/74 A |
| 5,111,032 | 5/1992 | Batliwalla et al. | 219/549 |
| 5,130,495 | 7/1992 | Thompson | 174/74 R |
| 5,313,019 | 5/1994 | Brusselmans et al. | 174/93 |
| 5,322,972 | 6/1994 | Fitch et al. | 174/88 R |
| 5,516,985 | 5/1996 | Merkel et al. | 174/74 A |

FOREIGN PATENT DOCUMENTS

| | | |
|---|---|---|
| 0 322 160 | 6/1989 | European Pat. Off. |
| 0 392 089 | 10/1990 | European Pat. Off. |
| 2227617 | 8/1990 | United Kingdom. |
| 2231735 | 11/1990 | United Kingdom. |
| WO 93/17477 | 9/1993 | WIPO. |
| WO 96/24975 | 8/1996 | WIPO. |

*Primary Examiner*—Kristine L. Kincaid
*Assistant Examiner*—Marc D. Machtinger
*Attorney, Agent, or Firm*—Marguerite E. Gerstner; Herbert G. Buckard

[57] ABSTRACT

An apparatus for sealing the end of an elongate cable such as a heating cable includes (1) a housing with a first open end and a second open end and a strain relief element positioned within the housing, (2) a flexible container which can be positioned over the cable end and (i) is of generally tubular shape, (ii) has an interior surface and an exterior surface, (iii) has a first open end and a second closed end, and (iv) contains a sealant; and (3) a cap which can be mated with the housing at the second open end, and cover the flexible container. The apparatus has excellent moisture-resistant properties even after repeated exposure to high temperatures, is reenterable, and can be readily mounted on a substrate such as a pipe.

15 Claims, 4 Drawing Sheets

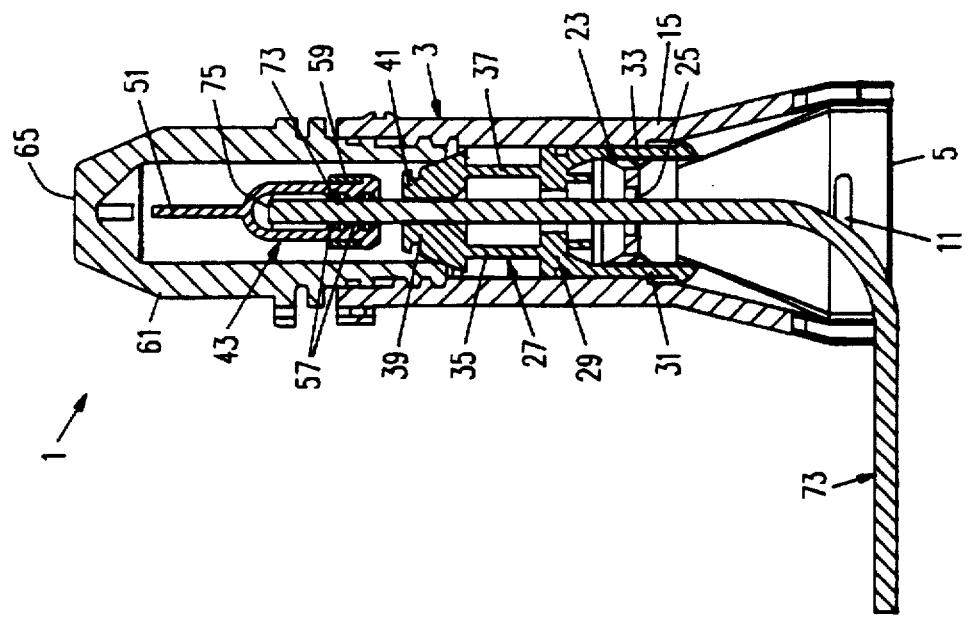
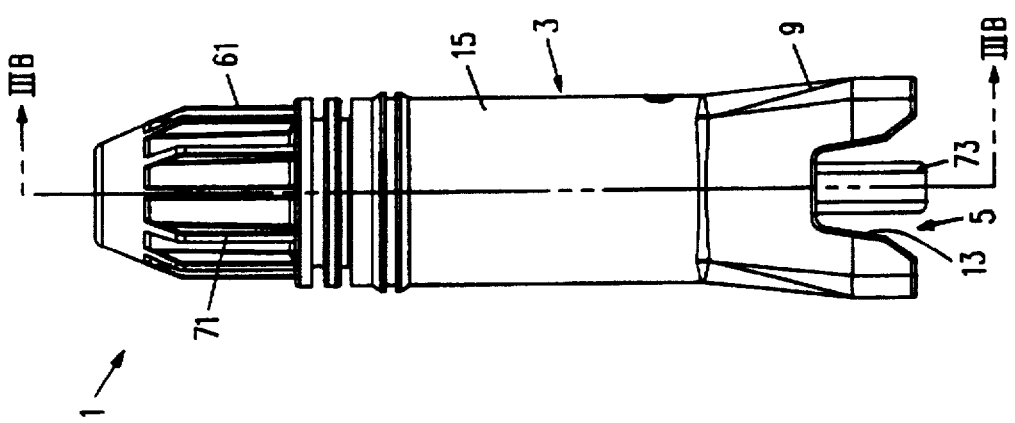

SEALING DEVICE

BACKGROUND OF THE INVENTION

1. Field of the invention

This invention relates to sealing devices, particularly sealing devices for elongate heating cables.

2. Introduction to the Invention

The ends of elongate cables such as power cords or heating cables often must be sealed in order to provide electrical insulation, environmental protection and/or mechanical shielding. Many methods and devices have been used to provide a seal, including heat-recoverable tubing, end-caps, or boots; molded adhesive-filled boots; enclosures with gaskets or grommet seals; and wrapped tape. Such methods have generally been unsatisfactory because of their craft-sensitivity, difficulty of installation, limitation to a particular size or shape of cable, or requirement for special tools. In addition, many of these methods have provided a seal that cannot be reentered without destroying the seal and/or the cable.

Many elongate cables are designed to be cut to length for a particular application, thus necessitating that the cable end be easily sealed. For some applications using elongate heating cables it is particularly important that the end seal be reenterable in order to periodically monitor the condition of the end of the cable, to check the voltage present in the cable, and/or to monitor the continuity of the cable. Conventional end caps and sealing devices for protecting the ends of such cables are known. See, for example, U.S. Pat. Nos. 4,751, 350 (Eaton) and 4,877,943 (Oiwa), and copending, commonly assigned U.S. patent application Ser. No. 08/384,164 (Edwards et al, filed Feb. 6, 1995), now U.S. Pat. No. 5,622,642 the disclosures of each of which are incorporated herein by reference. Such end caps often have one or more gripping members that serve to grip the cable to prevent pullout of the cable from the end cap. Such gripping members generally prevent reenterability without destruction of the cable and/or the end seal. In addition, such end caps often are filled with a gel component in order to provide a barrier to moisture. However, such gel-filled end caps may not be suitable for use under conditions in which the heating cable is exposed repeatedly to high temperature conditions. Under such conditions, the gel may be thermally unstable, breaking down and/or leaking from the end cap thus destroying the sealing ability. If a sealant such as a grease which exhibits good thermal properties at elevated temperature is used in a rigid end seal, volume changes resulting from changes in temperature cause shrinkage away from the cable and/or the rigid enclosure, creating leakage paths and destroying the sealing properties.

SUMMARY OF THE INVENTION

We have now found that a reenterable end seal with excellent moisture-resistant properties even after repeated exposure to high temperatures can be prepared if a sealant such as a grease is contained in a flexible container which has the ability to expand and contract during temperature cycling. Thus in a first aspect this invention provides an apparatus for sealing the end of an elongate cable, said apparatus comprising (1) a housing of generally cylindrical shape, the housing comprising
  (a) a first open end and a second open end; and
  (b) a strain relief element positioned within the housing;

(2) a flexible container which can be positioned over the cable end, which container (i) is of generally tubular shape, (ii) has an interior surface and an exterior surface, (iii) has a first open end and a second closed end, and (iv) contains a sealant; and (3) a cap which can (a) be mated with the housing at the second open end, and (b) cover the flexible container.

In a second aspect, the invention provides an assembly comprising (A) an apparatus according to the first aspect of the invention in which the cap (a) has been mated with the housing at the second open end, and (b) covers the flexible container; and (B) an end of an elongate cable which is inserted through the first open end of the housing and which directly contacts the strain relief element and the flexible container.

BRIEF DESCRIPTION OF THE DRAWINGS

The invention is illustrated by the drawings in which

FIGS. 3a and 3b are a plan view and a cross-sectional view, respectively, of the apparatus of FIGS. 2a and 2b after the cap and the housing of the apparatus have been tightened;

DETAILED DESCRIPTION OF THE INVENTION

Figure 1:
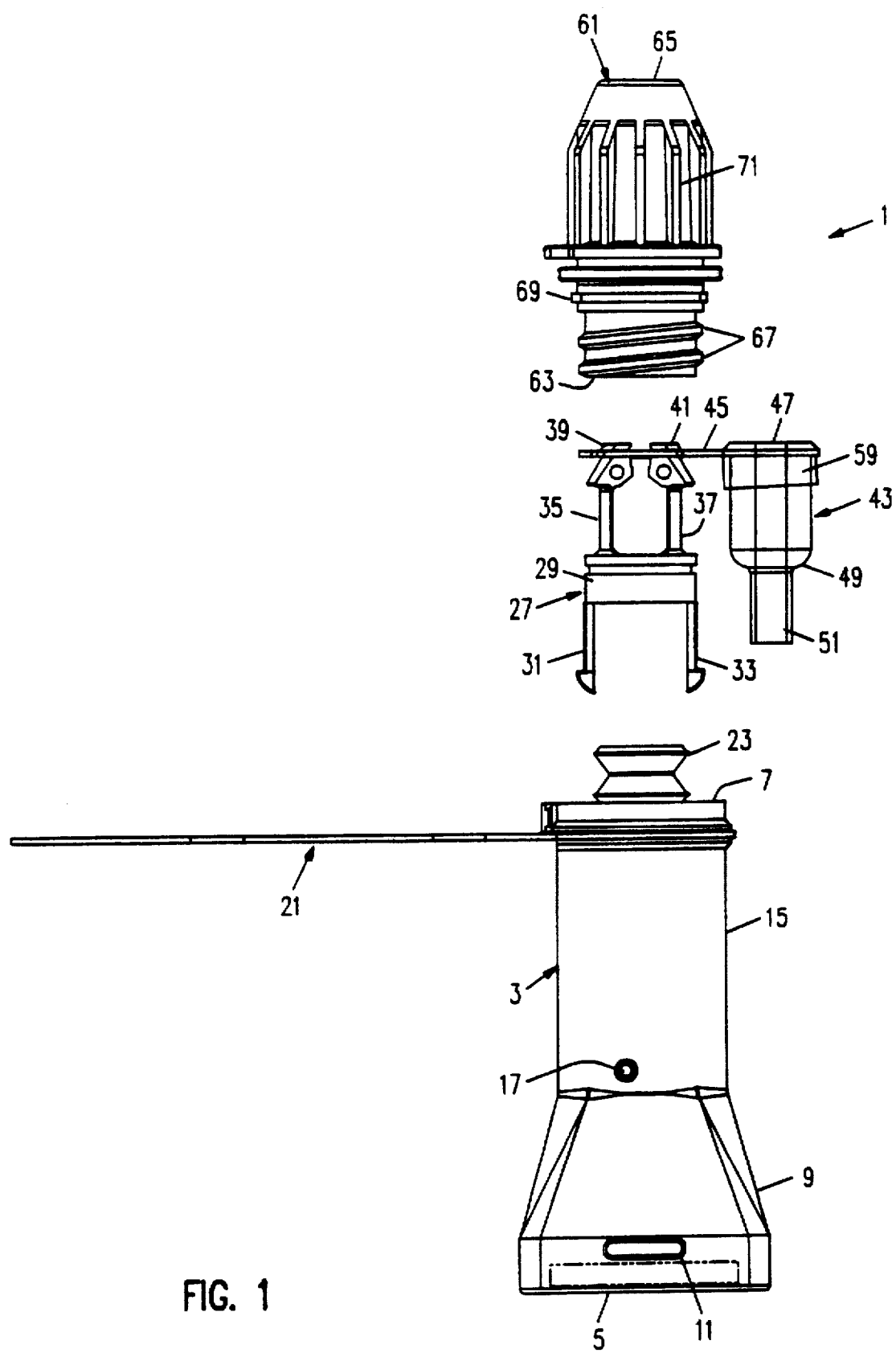
FIG. 1 is an exploded view of the components of the apparatus of the invention.

The sealing apparatus of the invention can be used to seal the end of any elongate cable, including electrical heating cables such as self-limiting strip heaters or mineral insulated heating cables, power cables or cords, or grounded power leads. Elongate electrical heating cables particularly appropriate for use with this sealing device are those which comprise first and second elongate electrodes, a plurality of resistive heating elements connected in parallel between the electrodes, and at least one insulating jacket surrounding the electrodes and heating elements. The insulating jacket is generally polymeric, in the form of a continuous polymer layer, although a polymeric braid or a polymer tape may be used. For some applications a polymeric insulating jacket is surrounded by a second layer, e.g. a second polymeric insulating layer such as a polyester tape, or a metallized tape such as aluminized polyester. The heating cable often comprises an optional metallic grounding braid surrounding the insulating jacket and the optional second layer. The metallic grounding braid serves to electrically ground the heating cable and also provides mechanical strength and abrasion resistance. When a metallic grounding braid is present, it is generally in the form of braided metal wires, although for applications in which flexibility is not critical, it is possible to use another type of metal layer, e.g. a sheath or metal tape. In some applications, the grounding braid itself is surrounded by an outer insulating jacket to provide environmental and electrical insulation to the heating cable. Particularly suitable heating cables are self-regulating strip heaters in which the electrodes are elongate wires and the heating elements comprise a conductive polymer composition. Heaters of this type are described in U.S. Pat. Nos. 3,858,144 (Bedard et al), 3,861,029 (Smith-Johannsen et al), 4,017,715 (Whitney et al), 4,242,573 (Batliwalla), 4,334,148 (Kampe), 4,334,351 (Sopory), 4,426,339 (Kamath et al), 4,459,473 (Kamath), 4,574,188 (Midgley et al), and 5,111,032 (Batliwalla et al), the disclosures of which are incorporated herein by reference. The heating cable generally has an approximately rectangular cross-section with two generally parallel faces, although other geometries, e.g. round, oval, or elliptical, can also be effectively sealed by the sealing device of the invention.

The housing of the apparatus is of generally cylindrical shape, e.g. tubular or rectangular, although the exterior and/or interior of the housing may vary in shape in different sections of the housing. For example, the housing may be generally circular in one part and generally rectangular in another part that contacts a substrate in order to provide a more substantial base for positioning on the substrate. The housing has a first open end suitable for insertion of the elongate cable and a second open end suitable for attachment to a cap. The housing may be a single piece, it may be assembled into a permanent configuration from a number of pieces, or it may comprise first and second housing members which are capable of existing in a demated or mated configuration. In the demated configuration, the housing members may be separate pieces or they may be connected, e.g. by hinges, straps or a snap-fit. When mated, the two housing members are in contact with each other, either directly or through a sealing member, e.g. a gasket, and in such mated configuration, the two housing members form a housing which has first and second openings at opposite ends. The wall thickness of the housing may be constant, although to provide strength, ribs, bosses, or exterior grooves may be present.

The first open end of the housing is that which is closest to the substrate. If the substrate is a pipe, the first open end may be shaped, e.g. curved, in order to accommodate the curvature of the pipe. In addition, the perimeter of the first open end may have indented regions in order to allow the cable to be easily inserted. The section of the housing comprising the first open end may be designed to allow insertion of an element other than a cable, e.g. a pipe adapter, a light, or an electronic component such as a thermostat, and so the open end may be shaped accordingly. Slots may be provided near the first open end for insertion of straps or cords to assist in securing the housing to a substrate.

The second open end of the housing is shaped to accommodate mating with a cap. Preferably either the interior or the exterior surface of the housing near the second open end is provided with screw threads which mate with those on the cap.

The housing may be of any length, although it generally has a height of 63.5 to 254 mm (2.5 to 10 inches). For many applications it is preferred that the height be sufficient that, when the cap is placed on the housing and the housing is installed on the substrate, the cap is exposed and visible above any insulation that may be on the substrate. The diameter of the housing may vary depending on the components inserted into the housing, but generally is 12.7 to 76.2 mm (0.5 to 3 inches).

Positioned within the housing is a strain relief element. This element serves to hold the cable in position with sufficient strength so that it cannot readily be pulled out of the assembled apparatus. Generally a "pullout force" of at least 11.4 kg (25 pounds), preferably at least 13.6 kg (30 pounds), particularly at least 15.9 kg (35 pounds) is required for routine use. (The pullout force can be measured according to Factory Mutual Approval Standard, Class No. 3820, September 1979, section 5.2.5, the disclsoure of which is incorporated herein by reference. In that test a known weight, e.g. 15.9 kg (35 pounds) is hung on the end of the inserted cable at an angle of 180° for one minute. The weight is then removed and the cable measured to determine if any slippage from the apparatus, or cutting or tearing of the cable jacket, has occurred.) In a preferred embodiment, the strain relief element comprises a base element which has a center opening which aligns with the axial passageway of any grommet that is present. The shape of the base element generally conforms to the shape of the interior of the housing so that the strain relief element is held in contact with the interior wall of the housing. To ensure this contact, the base element may comprise an o-ring or gasket which serves to fill any gaps between the base element and the interior wall of the housing. Extending from the base element toward the first open end are first and second positioning arms which serve to orient the strain relief element in the housing and may grip any grommet that is present. Extending from the base element toward the second open end are first and second gripping arms, each of which comprises a gripping member at the end. The gripping members, which serve to hold the cable in position, may be the same or different. The portion of the gripping member in contact with the cable may be smooth or it may comprise ribs or teeth. If teeth are present, they may penetrate the outer jacket of a polymer-insulated cable to enhance the contact with the cable. Both the positioning arms and the gripping arms have the ability to flex from the base element in order to accommodate different size grommets and/or cables. In addition, the gripping arms must be flexible enough to be forced toward one another when the cap is mated with the housing. Depending on the shape of the interior of the housing and the cable, there may be more than two positioning arms and/or gripping arms. For example, a round cable may be held more securely by three gripping arms than by two. The strain relief element may be a single piece or individual components, e.g. a base element and positioning arms, may be attached to one another to form the strain relief element.

For most applications, inserted within the housing is at least one grommet which is prepared from an elastomeric material which is capable of being compressed in the axial direction when formed into the grommet. Suitable materials include neoprenes and fluorinated materials such as vinylidene fluoride/hexafluoropropylene copolymer. Particularly preferred for use at elevated temperatures is silicone rubber which exhibits little if any degradation up to 150° C., and often much higher. The grommet may have any shape that allows contact and gripping of the inserted cable. A preferred grommet has an "hourglass" shape, i.e. the axial passageway through which the cable is placed has first and second inner end sections which taper inwardly from the ends of the grommet to an inner central section. The inner central section may be of substantially constant cross-section. When compressed, such a grommet provides both a longitudinal component for stress relief and a radial component. Such a grommet, an example of which is described in U.S. Pat. No. 5,052,699 (Tucker), the disclosure of which is incorporated herein by reference, allows cables of different sizes to be inserted into the grommet. The inner surface of the grommet may be smooth or ribbed. The axial passageway of the grommet may be of any shape, e.g. round or elliptical, although for many applications, an elliptical passageway is appropriate for gripping cables of different sizes. Thus one size of housing can be used for a variety of different sized cables. The grommet is generally positioned between the strain relief element and the first open end, although it can be between the strain relief element and the second open end. For some applications, two grommets are present, one above and one below the strain relief element. It is important that the volume of the inserted cable and the grommet in the housing are less than the free volume of the housing cavity in which they are compressed so that it is not necessary to compress the grommet against its bulk modulus, which would require excessive force to adequately displace the strain relief element in the axial direction.

The component that actually covers the end of the cable is a flexible container that, when the apparatus is in a mated configuration, is positioned within the housing in contact with the strain relief element, between the strain relief element and the second open end. The container is of generally tubular shape, having a first open end into which the cable can be inserted, cond a second closed end which is directed to the closed end of the cap. The container may be approximately circular in section, a shape that is preferred for a round cable such as a power lead; approximately elliptical in section, a shape that is preferred for some oval heating cables; approximately rectangular in section; or any other appropriate shape. For some applications, the container may be in the form of a "double" container which allows insertion of the cable into one container, and insertion of another component into the second container. In another embodiment the container may comprise a light or other electrical component in order to determine electrical continuity. The first open end of the container is shaped and sized to accept the inserted cable. For ease of insertion, the open end may be tapered inwardly toward the closed second end, although for some applications, there may be a lip at the opening in order to grip the cable and contain the installed sealant. It is preferred that at least one rib is present on the interior surface of the container in order to contact the cable and wipe off the sealant when the cable is removed from the container. Generally at least one pair of ribs is present, and there are preferably two or more pair. The ribs of each pair may be directly opposite one another on the top and bottom interior surfaces of the container, or they may be offset. The ribs must be long enough to allow contact with the cable, and in order to accommodate many different size cables using a single size of container, the ribs may be of graduated length. The ribs may be positioned directly on the interior surface of the container or on a separate insert that is positioned within the container. The length of the container is sufficient to allow insertion of at least 6.4 mm (0.25 inch), preferably at least 12.7 mm (0.5 inch), particularly at least 19.1 mm (0.75 inch), especially at least 25.4 mm (1.0 inch) of the cable. For some applications the container can be long enough to allow positioning over a light, or other component as well as the cable end.

The container is flexible, able to expand and contract as the cable is exposed to a thermal cycle. The container is preferably elastomeric, comprising, for example, a rubber such as ethylene/propylene/diene rubber, or a silicone rubber. For good thermal stability (i.e. up to 150° C., preferably up to 200° C.) and good solvent resistance, it is preferred that the elastomer be a silicone rubber or a fluorosilicone rubber. Fillers, including pigments and stabilizers, can be present in the material forming the container.

Contained within the container is a sealant which has sufficient viscosity to contact the inserted cable and maintain the contact during thermal cycling. In addition, the sealant acts to prevent moisture, fluids, and dust particles from contacting the cable end and acts as an electrical insulator. When the sealant expands and contracts due to thermal cycling of the inserted cable during an on/off cycle, changes in ambient temperature, or changes in substrate temperature, volume changes are accommodated in a manner which does not cause the sealant to extrude from its container, as would be the case with a rigid container. Thus, an excellent seal is maintained between the sealant and the cable. The sealant may be any suitable material but is preferably a grease which has good thermal stability at temperatures up to 150° C., preferably up to 200° C. A grease is a solid or semifluid lubricant comprising a thickening agent in a liquid lubricant. Such greases often comprise fillers such as clays or silica. Greases based on silicones or fluoropolymers are preferred. Greases having a National Lubrication Grade Index of at least 2 are suitable for use. It is preferred that the grease does not compression set when exposed to the operating temperatures required for the cable. Preferred greases are thixotropic silicone pastes containing silica, and perfluoroalkylpolyether oil filled with a telomer of tetrafluoroethylene. It is important that the grease be compatible with the material comprising the container so that no oils or fluids migrate from the grease to the container to swell and/or soften it. Thus, it is preferred that a container comprising a fluorosilicone be used with a silicone paste or a perfluoroalkylpolyether lubricant, while a container comprising a silicone rubber be used with a perfluoroalkylpolyether lubricant but not a silicone paste. Although the sealant can be applied by any means, for ease of manufacturing it is preferred that the sealant be pumpable. The container is preferably filled to at least 30%, particularly at least 40%, especially at least 50% by volume with the sealant.

For some applications, a rigid band surrounds the external surface of the container in the region of the ribs in order to provide adequate compression for different cable sizes. The band can be made of a metal, a ceramic, or a high strength polymer, e.g. an engineering plastic such as polyphenylsulfone or polyphenylene oxide. The thickness of the band is determined by the strength of the material from which it is made. The length of the band is sufficient to cover the ribs on the interior of the housing, but not so great as to limit expansion of the housing down the entire length of the housing. To assist in the application of the band to the container, an extension of the container, i.e. a "tail" can be formed at the closed end of the container. This extension can be sized so that when the cap is completely mated with the housing, the end of the extension section away from the container contacts the inner surface of the closed end of the cap.

When the container is located in the housing prior to mating the housing with the cap, the container is preferably attached to the strain relief element by means of a flexible attachment strap which allows the container to be positioned properly for installation of the cable. Alternatively, the container can be positioned within the cap, so that when the cap is mated with the housing, the container comes into position with the strain relief element.

The sealing apparatus also comprises a cap which can be mated with the second open end of the housing. Although any suitable connection means may be used to connect the cap to the housing, preferably the cap has screw threads at its open end which are sized to connect to those on the housing. By the action of screwing the cap into position, the strain relief element is engaged by being forced down toward the substrate and the grommet is compressed. To ensure that the seam between the cap and the housing is sealed and to prevent moisture ingress, the cap may also comprise an o-ring. In a preferred embodiment, the o-ring is positioned on the exterior surface of the cap, adjacent to the screw threads and between the screw threads and the closed end of the cap. When the cap is screwed into position, the o-ring is compressed to form the seal. The length of the cap is sufficient to completely enclose the container when the cable is installed, as well as to provide adequate space for the screw threads. In order to keep the components together before use, and for ease of installation, the cap may be attached to the housing by means of a flexible strap. The cap, as well as the flexible strap may be brightly colored to assist in locating the apparatus on a substrate. The cap may comprise ribs or bosses on its interior or exterior surface for strength.

The housing and cap may comprise an insulated metal or a ceramic but preferably comprise a polymer which has an impact strength of at least 5 foot-pounds, preferably at least 10 foot-pounds, when shaped into the final sealing device configuration, as measured by such tests as IEEE Test 515–1989, "Impact Test" (Test 5.1.6), Institute of Electrical and Electronics Engineers, 1989, the disclosure of which is incorporated herein by reference. Preferred polymers are of light weight, can be shaped by injection- or transfer-molding or similar processing techniques, and will withstand required intermittent use and continuous use temperatures. Appropriate polymers include polycarbonate, polyamide, polyphthalamide, polyester, polyphenylene sulfide, polyphenylsulfone, polyphenylene oxide, and other engineering plastics. The polymer may contain additional components, including fillers such as glass or graphite fibers or particles, pigments, stabilizers for thermal or ultraviolet stabilization, processing aids, and flame retardants.

The sealing apparatus of the invention can be used as part of an assembly which includes an elongate cable. When the cable comprises an electrical heating cable, it is preferred that the section of braid surrounding the section of cable that goes into the container, as well as any outer insulating jacket that covers that section of braid, be removed before insertion into the housing.

The apparatus of the invention is easy to use in a three step operation. After preparing the cable end by removing the proper length of outer insulating jacket and braid (if present), the cable is inserted into the housing. The container is then positioned over the cable end. Finally the cap is mated with housing. A important feature is that, once assembled, the apparatus can be reentered to allow monitoring of the condition of the end of the cable and continuity checking.

The invention is illustrated by the drawings in which FIG. 1 is an exploded plan view of sealing apparatus 1 of the invention. Housing 3, with first open end 5 and second open end 7, comprises a notional first rectangular section 9 and a second cylindrical section 15. Knock-out hole 17 is positioned in housing 3 to provide an optional drain for water or other fluids when the housing is positioned below a substrate. (A similar knock-out hole may be present in the cap.) The rectangular shape of the base of housing 3 provides good stability on a substrate and slot 11 allows a strap or cord to be passed through for attachment to a substrate. Located adjacent to second open end 7 is grommet 23, which, as shown, has an "hourglass" shape. Strain relief element 27 contains a base element 29 positioned between first and second positioning arms 31,33 and first and second gripping arms 35,37. First gripping member 39 lies at the end of first gripping arm 35, while second gripping member 41 lies at the end of second gripping arm 37. Flexible container 43 is attached to strain relief element 27 by means of attachment strap 45. Container 43 has first open end 47 for insertion of the cable and second closed end 49. Also shown is extension section 51. Compression band 59 surrounds container 43 near first open end 47. Cap 61 has first open end 63 and second closed end 65. Screw threads 67 sized to match those on the interior of housing 3 near second open end 7 are positioned near first open end 63. O-ring 69, designed to ensure a good seal when cap 61 is mated to housing 3, is positioned adjacent to screw threads 67. External ribs 71 provide a good gripping surface for mating the cap with the housing and actuating the strain relief system. Flexible connection strap 21, positioned under the lip surrounding second open end of the housing 3, may also be attached to cap 61.

Figure 2B:
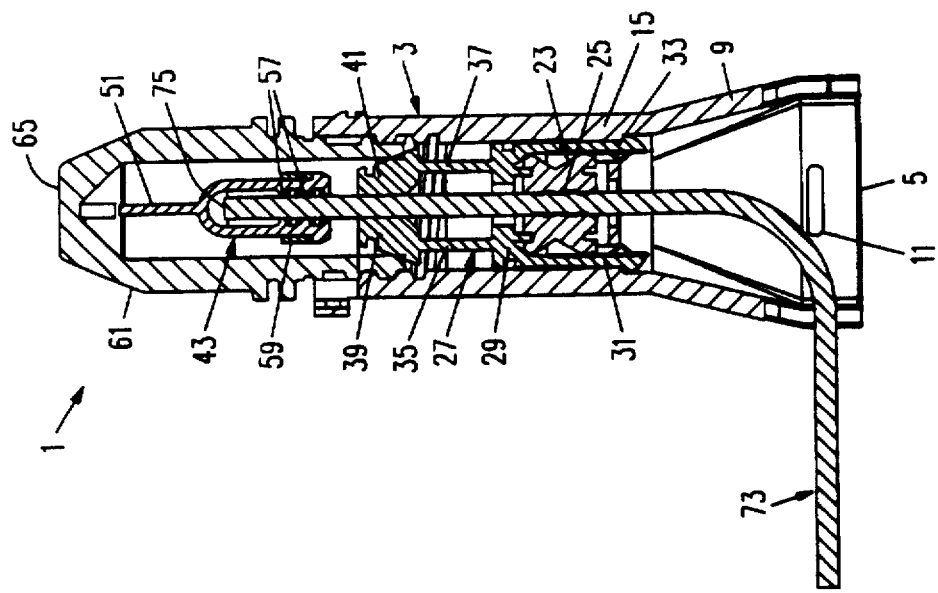
FIGS. 2a and 2b are a plan view and a cross-sectional view along line IIB—IIB, respectively, of an apparatus of the invention with an inserted cable prior to tightening of the cap.
Figure 2A:
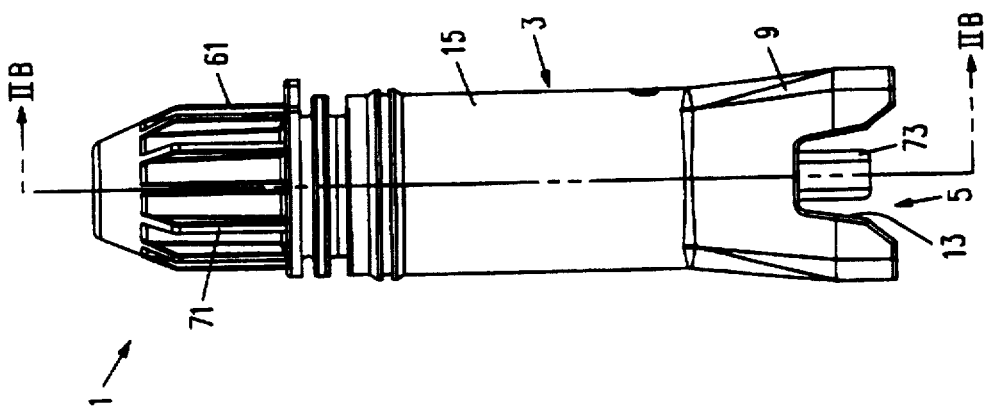

FIGS. 2a and 3a show apparatus 1 of the invention in plan view before (FIG. 2a) and after (FIG. 3a) mating of cap 61 with housing 3. FIGS. 2b and 3b show cross-sectional views of apparatus 1 along line IIB and IIIB, respectively, of FIGS. 2a and 3a. Cable 73, shown here as a heating cable, is inserted into first open end 5 through indention 13. Cable end 75 passes through axial passageway 25 of grommet 23 which is in contact with first and second positioning arms 31,33 of strain relief element 27. (Grommet 23 is held in place by pins which protrude from the bottom of base element 29, but are not shown.) Cable end 75 then passes through an opening in base element 29 and is gripped by first and second gripping members 39,41. Cable end 75 is inserted into first open end 47 of container 43 and is in contact with ribs 57. Compression band 59 is pre-positioned over ribs 57. Extension section 51 extends toward closed end 65 of cap 61. When cap 61 and housing 3 are completely mated (FIGS. 3a and 3b), grommet 23 is compressed axially as well as radially due to the tapered shape of the grommet and the cavity of the housing. In addition, first and second gripping arms 35,37 are compressed against the sides of the cable to ensure that first and second gripping members 39,41 are in good contact with cable 73.

Figure 4:
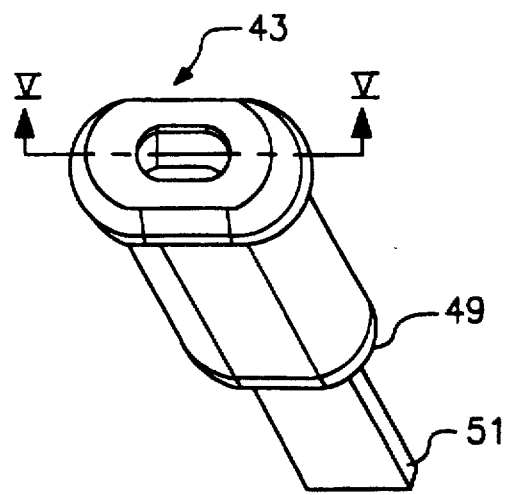
FIG. 4 is a perspective view of the container of the apparatus.
Figure 5:
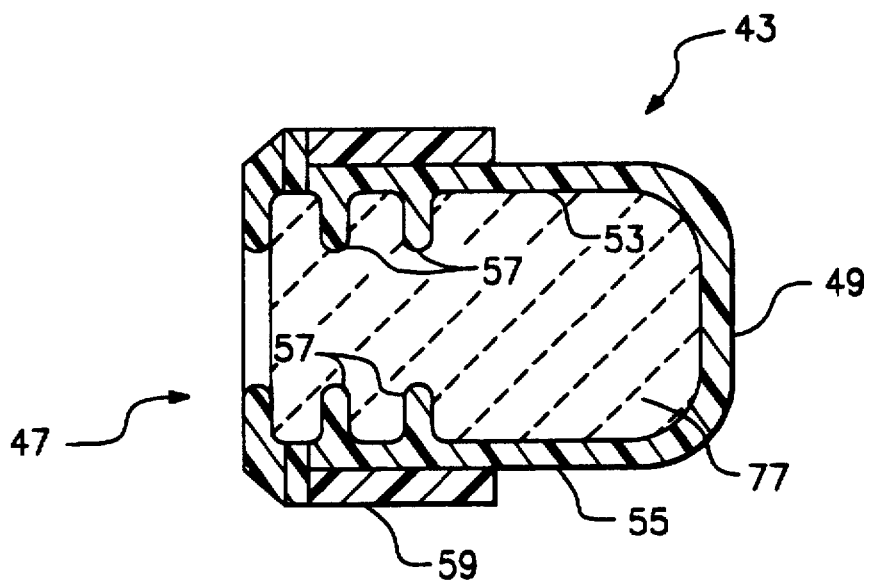
FIG. 5 is a cross-sectional view of the container of FIG. 4 along line V—V.

FIG. 4 is a perspective view of container 43 and FIG. 5 is a cross-sectional view along line V—V of FIG. 4 (without showing extension section 51). Container 43 has a generally tubular shape with first open end 47 and second closed end 49. As shown in this embodiment, first open end 47 has an opening of generally elliptical shape, although other shapes, e.g. circular or rectangular, may be suitable. Ribs 57 are in contact with interior surface 53, while compression band 59 contacts exterior surface 55 in the region of ribs 57. Contained within container 43, is sealant 77.

Though the invention has been described with regard to certain preferred embodiments thereof, it should be understood that the invention is not intended to be limited thereby. The various elements described can be combined as appropriate, and the invention is to be limited only by the appended claims.

What is claimed is:

1. An apparatus for sealing the end of an elongate cable, said apparatus comprising
  (1) a housing of generally cylindrical shape, the housing comprising
    (a) a first open end and a second open end; and
    (b) a strain relief element positioned within the housing;
  (2) a flexible container which can be positioned over the cable end, which container (i) is of generally tubular shape, (ii) has an interior surface and an exterior surface, (iii) has a first open end and a second closed end, and (iv) contains a sealant which comprises a grease;

(3) a cap which can (a) be mated with the housing at the second open end, and (b) cover the container; and (4) a rigid band positioned around the exterior surface of the container, said apparatus being reenterable.

2. An apparatus according to claim 1 wherein the housing comprises a grommet positioned within the housing and in contact with the strain relief element.

3. An apparatus according to claim 1 wherein the container is positioned within the housing in contact with the strain relief element.

4. An apparatus according to claim 1 wherein the container is inserted into the cap.

5. An apparatus according to claim 1 wherein the container comprises ribs on the interior surface.

6. An apparatus according to claim 1 wherein the container comprises an elastomer.

7. An apparatus according to claim 6 wherein the elastomer is a silicone or a fluoropolymer.

8. An apparatus according to claim 1 wherein the grease comprises silicone, fluorosilicone, or perfluoroalkylpolyether oil.

9. An apparatus according to claim 1 which further comprises a strap which connects the cap to the housing.

10. An apparatus according to claim 1 wherein the second open end of the housing comprises screw threads that can be mated with screw threads on the cap.

11. An apparatus according to claim 1 wherein the first open end of the housing is shaped for installation on a pipe.

12. An assembly comprising (A) a reenterable apparatus comprising (1) a housing of generally cylindrical shape, the housing comprising (a) a first open end and a second open end; and (b) a strain relief element positioned within the housing;

(2) a flexible container which (i) is of generally tubular shape, (ii) has an interior surface and an exterior surface, (iii) has a first open end and a second closed end, and (iv) contains a sealant which comprises a grease;

(3) a cap which (a) is mated with the housing at the second open end, and (b) covers the flexible container; and (4) a rigid band positioned around the exterior surface of the container; and (B) an end of an elongate cable which is inserted through the first open end of the housing and the first open end of the flexible container, and which directly contacts the strain relief element and the flexible container.

13. An assembly according to claim 12 wherein the elongate cable comprises an electrical heating cable comprising (1) first and second elongate electrodes;

(2) a plurality of resistive heating elements connected in parallel between said electrodes;

(3) an insulating jacket surrounding said electrodes and heating elements, wherein the insulating jacket and the cable end are in direct contact with the flexible container and the sealant.

14. An assembly according to claim 12 which further comprises a grommet which is positioned within the housing in contact with the strain relief element and through which the cable end passes.

15. An assembly according to claim 12 which is positioned on a pipe.

* * * * *